March 25, 1969  F. G. HERKNESS ET AL  3,434,215
APPARATUS FOR DISPENSING AND MEASURING STRAND MATERIAL
Filed Nov. 1, 1966

INVENTORS
FRANK G. HERKNESS
BY CHARLES W. SIMMONS, JR.

*Edward M. Farrell*
ATTORNEY

INVENTORS
FRANK G. HERKNESS
BY CHARLES W. SIMMONS, JR.

Edward M. Farrell
ATTORNEY

United States Patent Office 3,434,215
Patented Mar. 25, 1969

3,434,215
APPARATUS FOR DISPENSING AND MEASURING STRAND MATERIAL
Frank G. Herkness, Philadelphia, and Charles W. Simmons, Jr., Huntingdon Valley, Pa., assignors to The Budd Company, Philadelphia, Pa., a corporation of Pennsylvania
Filed Nov. 1, 1966, Ser. No. 591,234
Int. Cl. G01b 3/00
U.S. Cl. 33—127
1 Claim

ABSTRACT OF THE DISCLOSURE

Apparatus for dispensing and measuring a plurality of separate strands of wire is provided. Strand gripping devices for gripping the ends of the wire are provided to hold the wire until the proper lengths are attained. The wires are then selectively and individually released at the desired length.

---

This invention relates to apparatus for dispensing and measuring strand material, particularly electrical cables, and has for an object the provision of improvements in this art.

The invention has been developed in connection with dispensing and measuring a plurality of electrical cables for wiring railway passenger cars and will be described with particular reference to this use. When a number of railway cars of the same kind are being built there will be a number of different cables or cable groups each of a predetermined length. It is a slow, tedious, and possibly inaccurate job to pull out, measure, and cut off each cable by hand and assemble the cables in a group. Some of the cables may be so large and heavy that hand dispensing is burdensome, making power dispensing desirable.

Accordingly, it is one of the specific objects of the present invention to provide apparatus for dispensing a length of strand material from a source of supply, measuring its length as it is dispensed, and halting the dispensing action when the desired length has been drawn out from the source.

Another object is to provide gripping means for the strand dispensing apparatus and means for releasing the strand gripping means when a desired length of strand material has been dispensed.

Another object is to provide a power-traversed carriage for dispensing strand material and means activated by the travel of the carriage for registering the length of strand material which has been dispensed as the carriage moves along its ways.

Another object is to provide means for slowing and halting the movement of the carriage as it reaches a selected point in its travel whereby a given length of strand material is accurately dispensed without overrunning the desired length.

Another object is to provide means for halting the movement of the carriage at the ends of its travel and reversing its direction of travel without danger of overrunning the ends of its ways or track.

Another object is to provide complete safety protection for the operator and the product.

Figure 1:
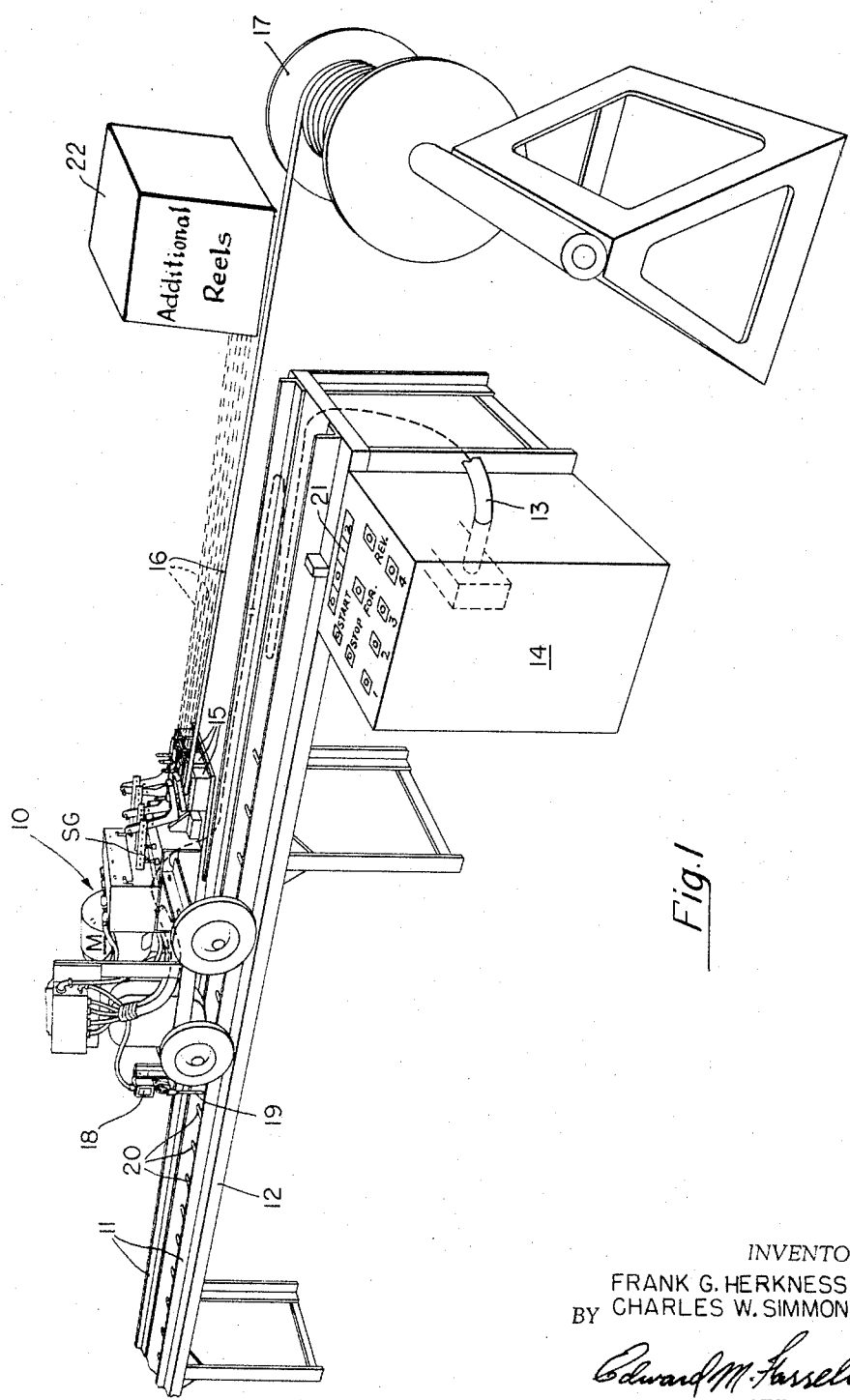
Figure 2:
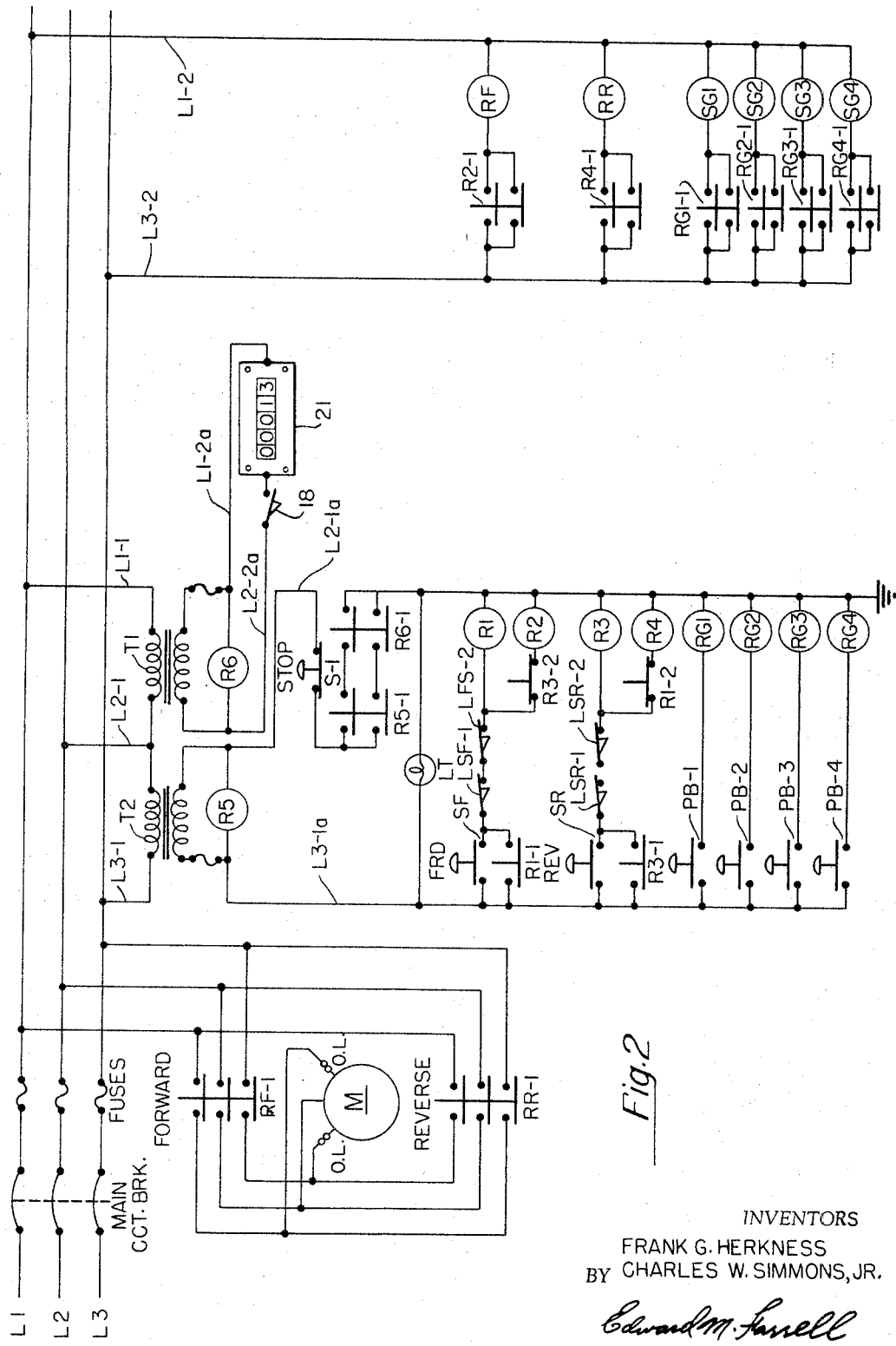

The above and other objects of the invention, as well as various features of novelty and advantages, will be apparent from the following description of apparatus for pulling out and measuring a plurality of different lengths of wire bundles or packs each comprising up to ten wires, reference being made to the accompanying drawings, wherein:

FIG. 1 is a perspective view of the apparatus;
FIG. 2 is a wiring diagram.

As shown in FIG. 1, a carriage 10 having a traversing drive motor M is mounted on ways or tracks 11 supported on a suitable frame 12. A flexible power and control cable 13 leads from the carriage to a control unit 14. The carriage is provided with one or more, here four being shown, strand gripping devices 15 controlled by solenoids SG (designated SG1 to SG4 herein). The specific arrangement is that the jaws release the strand when a solenoid is energized. This requires voluntary manual action to open the gripper, as at the start and when a given length is measured, and avoids accidental opening, as by power failure.

Strands 16 are shown to be held at the end by one of the gripping devices 15 and as being pulled off a source of supply in the form of a drum or reel 17 under some tension to avoid slack, the other reels being shown schematically for simplicity as a block 22.

The length measuring means comprises an impulse device 18, such as a microswitch, mounted on the carriage with an operating finger 19 which engages evenly spaced operating elements, such as pins or bars 20 which can readily be shifted in location, if desired, along the length of travel of the carriage on its tracks. There may be as many operating elements as desired, the illustrated arrangement being one per foot of length. Impulses from the device 18 activate a counter 21 mounted on the control unit 14.

Referring to the wiring diagram of FIG. 2, power is supplied, as by three phase alternating current, at say 400 volts, by main power leads L1, L2, and L3. The motor M is controlled for forward and reverse carriage travel by power gang contact switches RF–1, RR–1, respectively from relays RF and RR respectively in an offtake control circuit having leads L1–2 and L3–2, this providing 220 volts.

A manual control circuit is supplied with current by leads L1–1, L2–1 and L3–1 through transformers T1 and T2. As long as power is available safety "current-on" relays R5 and R6 are kept energized to hold closed their dual-contact switches R5–1 and R6–1 in a line of circuit L3–1a, L2–1a (110 volts) through a normally closed stop pushbutton switch S–1 to energize an "on" signal lamp LT and supply power to the control circuits.

Forward traversing movement of the carriage is effected by closing a normally open pushbutton switch SF which supplies current to shunt relays R1 and R2. Energization of relay coil R1 closes its normally open lock-in contact switch R1–1 and opens a normally closed safety contact switch R1–2 in the reverse control circuit.

Relays R1 and R2 are in series with travel limit switches LSF–1 and LSF–2 located near the end of the forward travel of the carriage along its track to cut off power and prevent over-travel, the carriage holding LSF–2 open when it stops. A normally closed safety switch R3–2 is in circuit with relay coil R2 to avoid energization of the forward-travel circuit of the reverse-travel circuit is energized.

Energization of relay coil R2 closes its normally open paired contact switches R2–1 to energize power solenoid relay coil RF which, in turn, closes plural-contact ganged switch RF–1 to cause the carriage to move forward.

Reverse traversing movement of the carriage is effected by closing a normally open pushbutton switch SR which supplies current to shunt relays R3 and R4. Energization of relay coil R3 closes its normally open lock-in contact switch R3–1 and opens the normally closed safety contact switch R3–2 in the forward control circuit, as previously mentioned.

Relays R3 and R4 are in series with travel limit switches LSR–1 and LSR–2 located near the end of the rearward travel of the carriage along its track to cut off power and prevent overtravel, the carriage holding LSR–2 open when stopped. The normally closed safety switch R1–2 in series with the relay coil R4 has already been described.

Energization of relay coil R4 closes its normally open paired contact switches R4–1 to energize power solenoid relay coil RR which, in turn, closes plural-contact ganged switch RR–1 to cause the carriage to move rearward.

The four strand gripper operating solenoids SG–1, SG–2, SG–3 and SG–4 are energized respectively by power relay contact switches RG1–1, RG2–1, RG3–1 and RG4–1 respectively, these contact switches being paired, normally open, and closed by energization of relay coils RG1, RG2, RG3 and RG4, respectively, when pushbutton switches PB–1, PB–2, PB–3 and PB–4 respectively, are closed as the desired length of each strand is registered on the counter 21.

The counter 21 and the contact switch of the impulse device 18 are in a circuit of power lines L1–2a and L2–2a of the transformer T1 (110 volts).

In operation, after the power has been applied at the main circuit breaker gang switch, the relays R5 and R6 are energized and remain energized as long as the circuit is energized. Assuming that the ends of four strands are engaged by the grippers when the carriage is at the rear end of its travel, the carriage is caused to move forward by closing the forward travel pushbutton SF. All strands are pulled out from the source of supply as the carriage advances and the length of strands is shown by the counter 21. As the desired length for each strand is reached the appropriate pushbutton PB–1 to PB–4 is closed to release the strand from its gripper, the carriage then moving on without the released strand but continuing to pull out such strands as have not been released until they too have reached the desired length and have been released.

If desired, the carriage can be inched as a desired length is approached by alternately opening the stop pushbutton switch S–1 and closing the forward travel pushbutton switch SF.

When the carriage reaches the end of its forward travel it will open limit switches LSF–1 and LSF–2 and stop.

Reverse movement is produced by closing pushbutton switch SR. At the end of its reverse movement the carriage will open limit switches LSR–1 and LSR–2 and stop.

After the measured strands have been cut off and the strand ends from the source gripped, the pushbutton switch SF is closed and the described dispensing and measuring procedure repeated.

It will be seen that the invention provides convenient, accurate, and easily operated apparatus for dispensing and measuring strand material. While counter observation and manual strand release by an operator is illustrated it is to be understood that automatic strand release as a given length has been pulled out may readily be provided, as for example, by setting release impulse producing elements at selected points along the track in a manner similar to that in which tab stops are provided on a typewriter.

While one embodiment of the invention has been described for purposes of illustration, it is to be understood that there may be various embodiments and modifications within the general scope of the invention.

We claim:

1. Apparatus for dispensing and measuring a plurality of separate strands of material drawn from a source of supply providing separate supply means for the plurality of separate strands, comprising in combination, a plurality of means for gripping one end of said strands, means movable along a way for drawing out said strands of material from said source of supply, and means for terminating the withdrawal of each of said separate strands individually as desired from the source of supply when the desired length of each separate strand of material has been drawn out from said source of supply.

References Cited
UNITED STATES PATENTS

| | | | |
|---|---|---|---|
| 3,070,147 | 12/1962 | Schalich | 72—26 |
| 2,388,875 | 11/1945 | Skinner | 33—125 |
| 2,276,302 | 3/1942 | Guttmann | 33—125 |

LEONARD FORMAN, *Primary Examiner.*

F. S. D'AMBROSIO, *Assistant Examiner.*